United States Patent [19]

Kumagai et al.

[11] Patent Number: 5,396,327
[45] Date of Patent: Mar. 7, 1995

[54] FIBER-OPTIC GYROSCOPE HAVING ANGULAR VELOCITY CORRECTION

[75] Inventors: Tatsuya Kumagai; Hiroshi Kajioka, both of Hitachi; Hisao Sonobe, Katsuta, all of Japan

[73] Assignees: Hitachi Cable, Ltd.; Hitachi, Limited, Tokyo, Japan

[21] Appl. No.: 982,206

[22] Filed: Nov. 25, 1992

[30] Foreign Application Priority Data

Nov. 29, 1991 [JP] Japan ................................. 3-316724

[51] Int. Cl.[6] .............................................. G01C 19/72
[52] U.S. Cl. .................................................... 356/350
[58] Field of Search .......................... 356/350; 250/238

[56] References Cited

U.S. PATENT DOCUMENTS 4,986,665 1/1991 Yamanishi et al. ................. 356/350
5,272,516 12/1993 Ashizuka ............................. 356/350

*Primary Examiner*—Samuel A. Turner
*Attorney, Agent, or Firm*—Thomas K. Ziegler

[57] ABSTRACT

The light emitted from a laser diode is divided into two lights and the divided lights are introduced into a sensing loop such that the lights propagate through the sensing loop clockwise and counterclockwise. These lights are combined by a light receiving device and then a signal processing circuit calculates an angular velocity $\Omega'$. The temperature near the laser diode is detected to obtain a correction value Kt, a current supplied to the laser diode is detected to obtain a correction value Ki and a corrected angular velocity $\Omega$ is obtained by calculating the product of the angular velocity with the correction values Ki and Kt, i.e., $\Omega = \Omega' * Ki * Kt$.

13 Claims, 3 Drawing Sheets

FIBER-OPTIC GYROSCOPE HAVING ANGULAR VELOCITY CORRECTION

BACKGROUND OF THE INVENTION

1. Technical Field

The present invention relates to a fiber-optic gyroscope, and more particularly to a fiber-optic gyroscope which can correct angular velocity information.

2. Background Art

A mechanical gyroscope which employs a rotating system is conventionally used to control an attitude of, for example, airplanes and rockets, and in recent years a fiber-optic gyroscope which employs a loop optical fiber instead of the rotating system is also used.

FIG. 2 of the accompanying drawings shows the schematic construction of such a fiber-optic gyroscope. In this illustration, a drive circuit for a light source module 1 is not shown. The light source module 1 incorporates a laser diode which emits laser beams in two opposite directions (toward items 2a and 9 respectively in the illustration). A high birefringence polarization maintaining (PM) fiber extends to a directional coupler 2a from the light source module 1 and one light emitted from the laser diode of the light source module 1 is divided into two lights by the directional coupler 2a. One of them passes through a polarizer 3 and, is further divided into two lights by a second directional coupler 2b. One of these two lights enters a PM fiber loop 5 via a connection point 4 and propagates in the loop 5 counterclockwise whereas the other passes through an optical phase modulator 6 via another connection point 4, enters the PM fiber loop 5 and propagates in the loop 5 clockwise. The lights which have entered the PM fiber loop 5 respectively exit from the loop 5 at opposite ends of the loop 5 and proceed through the directional coupler 2b, the polarizer 3 and the directional coupler 2a respectively and these lights are received by a light receiver 7. Then, a signal processing is performed in a signal processing circuit 8 to obtain an angular velocity and an angle and to control the degree of modulation of the optical phase modulator 6. This phase modulator 6 is controlled with respect to its modulation degree by applying an alternating voltage to a PZT cylinder of the phase modulator 6. Generally, a PM fiber of 2–3 m (or may be more) is around the PZT cylinder to constitute the optical phase modulator 6.

Meantime, the other light emitted from the laser diode of the light source module 1 proceeds to the signal processing circuit 8 through the diode 9 and it is used to control the amount of the opposite light (tile one directed to the directional coupler 2a).

The fiber-optic gyroscope causes the light from the light source to propagate into the optical fiber, detects a phase difference $\Delta\theta$ (Sagnac Effect) produced between the light propagating clockwise and counterclockwise in the loop, and obtains the angular velocity $\Omega$.

The relation between this phase difference $\Delta\theta$ and the angular velocity $\Omega$ is expressed by the following formula:

$$\Delta\theta = (4\pi RL/\lambda c)*\Omega \quad (1)$$

Here, R represents a radius of the sensing loop 5, L represents the length of the optical fiber, $\lambda$ represents the wavelength of the light and c represents the light velocity. Among the constants of the formula (1), the wavelength $\lambda$ has the largest degree of fluctuation.

FIG. 3 of the accompanying drawings is a graph showing a light source temperature-wavelength characteristic and FIG. 4 of the accompanying drawings is a graph showing a current-wavelength characteristic.

In FIG. 3, the horizontal axis indicates the temperature and the vertical axis indicates the wavelength, and it can be appreciated that the wavelength increases as the temperature rises. In FIG. 4, on the other hand, the horizontal axis indicates the current and tile vertical axis indicates the wavelength, and it is appreciated that the wavelength decreases as the current increases. Therefore, since the relation between the phase difference $\Delta\theta$ and the angular velocity $\Omega$ varies with the temperature and/or the current, conventional following methods are taken as countermeasures:

(1) To attach a Peltier element to the light source so as to maintain the light source module 1 at a constant temperature while driving the light source with a constant current circuit; and (2) To drive the light source with an APC (Auto-Power Control) circuit and monitor the temperature by a thermistor located near the light source. A correction value is obtained from a temperature detected by the thermistor, and multiplying the formula (1) by the correction value results in the corrected angular velocity information.

However, the above method (1) has following problems:

(i) An applicable temperature range is not wide, i.e., the range which can maintain the temperature with the Peltier element is 0°–40° C.;

(ii) Power consumption of the entire system which incorporates the fiber-optic gyroscope is large since the power used for the Peltier element is large; and (iii) System is expensive.

Method (2) is problematic in that since the current flowing in the light source module 1 fluctuates, a perfect correction cannot be expected.

Another type of optic-gyroscope is proposed in a certain Japanese Patent Application (Publication No. 3-92734, published Apr. 17, 1991). The invention disclosed in this publication is directed to a method of measuring a temperature using a fiber-optic sensor. The temperature as measured is used to correct various parameters of a fiber-optic sensor. Specifically, according to the teaching of this publication, the temperature around a light source is obtained from the relation between an intensity of light output from the light source and a current applied to drive the light source. Then, the temperature is used for the compensation of scale factor fluctuation. However, this technique has a following problem: A discrepancy between an optical axis of the light source placed in a light source module and an optical axis of the optical fiber appears as the temperature changes. This is an optical output change due to a mechanical structure. It is believed that the relation between the intensity of the light and the drive current is not enough to determine the temperature in the vicinity of the light source. Accordingly, a perfect scale factor compensation cannot be expected.

SUMMARY OF THE INVENTION

A purpose of the present invention is to provide a fiber-optic gyroscope which eliminates the above-mentioned problems.

According to one aspect of the present invention, there is provided a fiber-optic gyroscope which comprises a sensing loop, means for dividing a light emitted from a light source into two lights, means for introducing the divided lights into the sensing loop such that the divided lights propagate through the sensing loop clockwise and counterclockwise, means for comparing the lights exiting from the sensing loop to obtain a phase difference between these two lights, means for calculating an angular velocity using the phase difference between the two lights, means for detecting a temperature near the light source to obtain a first correction value relative to the temperature, means for detecting a current supplied to the light source to obtain a second correction value relative to the current and means for correcting the angular velocity with the first and second correction values.

A circuit for driving the light source is preferably comprised of an APC circuit.

The fiber-optic gyroscope of the present invention can provide an accurate angular velocity since the influence of the temperature and the current which conventionally affect the accuracy of the angular velocity are eliminated. Specifically, the fiber-optic gyroscope of the present invention detects the temperature near the light source to obtain the correction value to the temperature fluctuation and detects the current fed to the light source to acquire the correction value to the current fluctuation, so that upon calculating the product of these two modification values and the angular velocity, it is possible to perform an appropriate correction to the temperature fluctuation and the drive current fluctuation and to obtain an accurate angular velocity.

If the APC circuit is provided, the applicable temperature range becomes wide.

In addition, since the Peltier element is not used, the power consumption is reduced.

Further, since the current fed to the light source is monitored to obtain the correction value and the temperature near the light source is detected to obtain another correction value to correct the angular velocity, the fiber-optic gyroscope can exhibit a stable performance without enlarging the system and an inexpensive gyroscope can be realized.

Other aspects, objects, and advantages of the present invention will be more fully understood by reference to the following detailed description as taken in conjunction with the attached drawings and appended claims.

DETAILED DESCRIPTION OF THE PREFERRED EMBODIMENTS

Now, an embodiment of the present invention will be explained with reference to the accompanying drawings.

Figure 1:
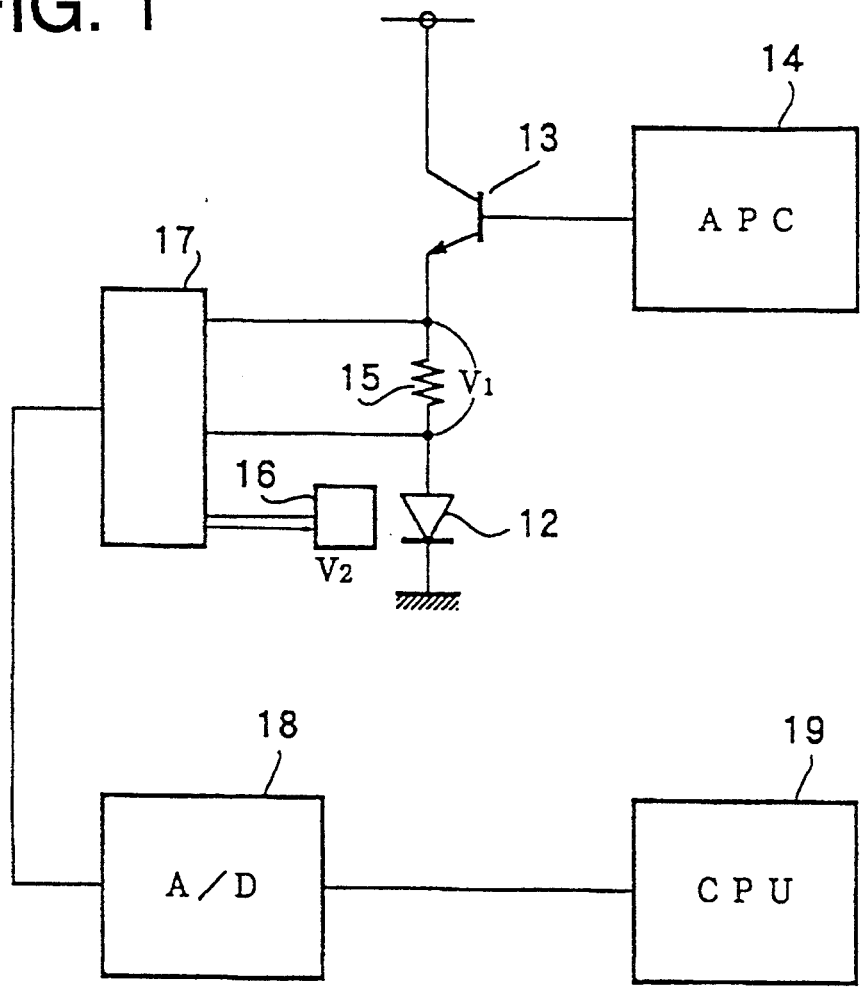
FIG. 1 is a block diagram of part of a signal processing circuit applied to a fiber-optic gyroscope according to the present invention.
Figure 2:
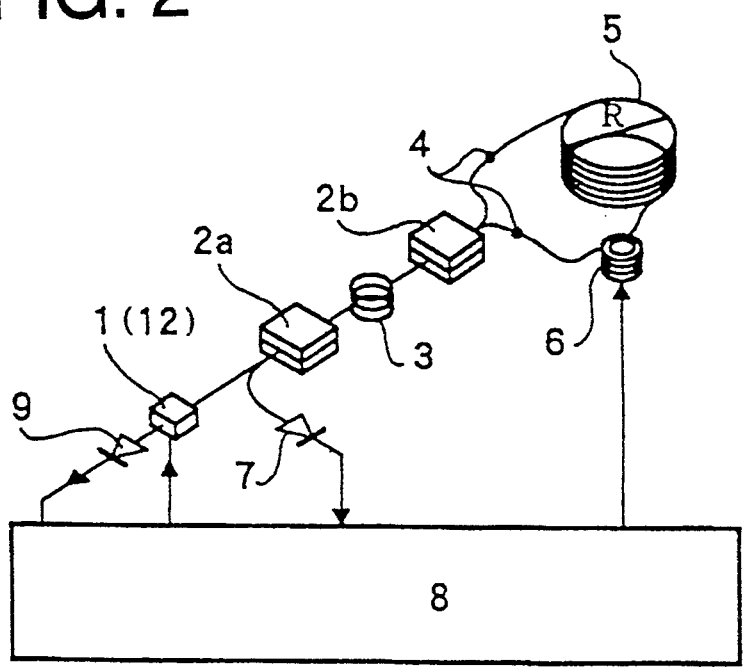
FIG. 2 illustrates a schematic view of a fiber-optic gyroscope.

A signal processing circuit of FIG. 1 is an improvement of the circuit 8 of FIG. 2 and the laser diode 12 (light source) of FIG. 1 corresponds to the diode (not shown) incorporated in the light source module 1 of FIG. 2.

Referring to FIG. 2, a high birefringence polarization maintaining (PM) fiber extends from the light source 12 to a first directional coupler 2a and one light emitted from the light source 12 is divided into two lights by the first directional coupler 2a. One of them passes through a polarizer 3 and is further divided into two lights by a second directional coupler 2b. One of these two lights enters a PM fiber loop 5 via a connection point 4 and propagates in the loop 5 counter-clockwise whereas the other passes through an optical phase modulator 6 via another connection point 4, enters the PM fiber loop 5 and propagates in the loop 5 clockwise. The lights which have entered the PM fiber loop 5 respectively exit from the loop 5 at opposite ends of the loop 5 and proceed through the directional coupler 2b, the polarizer 3 and the directional coupler 2a respectively and these lights are received by a light receiver 7. Then, a signal processing is performed in a signal processing circuit to obtain an angular velocity and an angle and to control a degree of modulation of the optical phase modulator 6. The phase modulate 6 generally includes a PZT cylinder and a PM fiber is wound around the PZT cylinder. The phase modulator 6 is controlled by the signal processing circuit with respect to its modulation degree by applying an alternating voltage to the PZT cylinder.

Referring back to FIG. 1, a bipolar transistor 13, a resistance 15 and the laser diode 12 are connected in series, and a power source is connected to the collector of the transistor 13 and the cathode of the laser diode 12. The base of the transistor 13 is connected to an APC circuit 14 and the APC circuit 14 drives the laser diode 12.

Both ends of the resistance 15 are connected with a couple of input terminals of a multiplexer 17 and a thermistor 16 located near the laser diode 12 is connected with the other couple of input terminals of the multiplexer 17. Voltage V1 across the resistance 15 and voltage V2 generated at the thermistor 16 are selectively input to an A/D converter 18 according to the position of a switch (not shown) of the multiplexer 17. An output of the A/D converter 18 is connected to an input of a CPU 19 so that a digitized signal is input to the CPU 19. The resistance 15 is a means for detecting the current, the thermistor 16 is a means for detecting the temperature, and the multiplexer 17, A/D converter 18 and CPU 19 constitute, in combination, means for correcting the angular velocity information.

Now, the operation of the embodiment will be explained.

The transistor 13 and in turn the laser diode 12 are driven by the APC circuit 14, so that the laser beam is emitted into the PM fiber (the fiber spanning between the light source module 12 and the directional coupler 2a in FIG. 2). Since the current flowing in the laser diode 12 varies with the amount of light flowing in the laser diode 12, the voltage V1 across the resistance 15 is input to the inputs of the multiplexer 17 to detect the voltage V1 as the current of the laser diode 12. The temperature near the laser diode 12 is detected by the thermistor 16 and the voltage V2 is input to the other inputs of the multiplexer 17.

When the switch of the multiplexer 17 is on the resistance 15 side, the resistance 15 and the A/D converter 18 are connected with each other so that the voltage V1 is input to the A/D converter 18 and A/D converted and the resultant is read by CPU 19.

Figure 3:
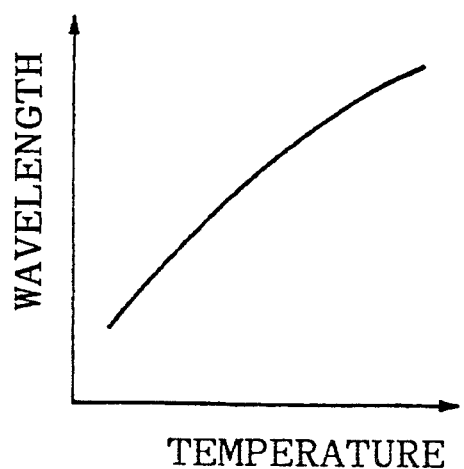
FIG. 3 illustrates a graph showing a light source temperature-wavelength characteristic.
Figure 4:
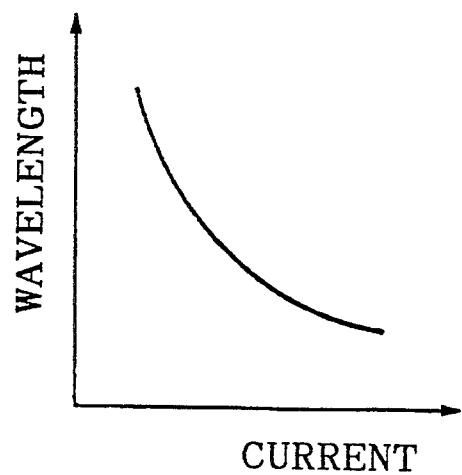
FIG. 4 shows a graph showing a light source current-wavelength characteristic.

In the CPU 19, the current flowing in the diode 12 is calculated from the voltage V1 of the resistance 15 and a correction value Ki is searched from a table stored in the CPU 19 using the current of the resistance 15. Meantime, the current of the thermistor 18 is calculated from the voltage V2 of the thermistor 16 and another correction value Kt is searched using the table stored in the CPU 19. The table is prepared by combining the temperature-wavelength characteristic of FIG. 3 and the current-wavelength characteristic of FIG. 4. Of course, it is possible to prepare two tables which correspond to FIGS. 3 and 4 respectively.

An angular velocity $\Omega'$ is already obtained from the phase difference $\Delta\theta$ between the clockwise and counter-clockwise lights propagating the sensing loop 5, and the angular velocity $\Omega'$ and the correction values Ki, Kt are input to the following formula to acquire a corrected angular velocity $\Omega$.

$$\Omega = \Omega' * Ki * Kt \quad (2)$$

Generally obtaining the characteristic (the aforementioned current-wavelength and temperature-wavelength characteristics) of the laser diode 12 beforehand is enough in designing the tables of correction values Ki and Kt. However, if the characteristic of the presently used laser diode 12 is different from that of a laser diode to be used next, the next laser diode 12 is mounted on the fiber-optic gyroscope and the characteristic of the laser diode is evaluated to prepare another table for the correction values Ki and Kt.

As described above, since the angular velocity $\Omega$ is obtained without the Peltier element, the applicable temperature range is large and the power consumption is reduced, as compared with a conventional one using the Peltlet element. In addition, the problem of the conventional method using the APT circuit in driving the light source, i.e., the imperfect wavelength correction due to the drive current change, is eliminated since the change of the drive current (current flowing through the resistance 15) is detected and used for the compensation. Further, since the temperature near the laser diode 12 and the drive current of the laser diode 12 are detected to correct the wavelength of the laser beam, an accurate angular velocity can be obtained.

It should be noted that although the laser diode is employed as the light source, another light source may be employed if it can be used for the fiber-optic gyroscope. Further, although the bipolar transistor 13 is employed in driving the light source, a field-effect transistor may be employed. Moreover, although the correction values Ki and Kt are stored in the table, they may be calculated by preparing voltage-temperature equation, voltage-current equation and/or voltage-wavelength equation for the correction values respectively and substituting appropriate values into these equations.

We claim:

1. A fiber-optic gyroscope comprising:
   a sensing loop;
   means for dividing a light emitted from a light source into two lights;
   means for introducing the divided lights into the sensing loop, the lights propagating through the sensing loop clockwise and counterclockwise;
   means for comparing the lights exiting from the sensing loop to obtain a phase difference between the lights using the phase difference;
   means for calculating an angular velocity using the phase difference;
   means for detecting a temperature near the light source to obtain a first correction value to the temperature;
   means for detecting a current supplied to the light source to obtain a second correction value to the current; and
   means for obtaining a corrected angular velocity using a product of the first correction value, the second correction value and the angular velocity.

2. The fiber-optic gyroscope of claim 1, further including a drive circuit and wherein the light source includes a laser diode which is driven by the drive circuit to emit the light.

3. The fiber-optic gyroscope of claim 2, wherein the drive circuit includes a resistance connected to the laser diode at one end thereof and a transistor connected to the other end of the resistance to control the current flowing therethrough.

4. The fiber-optic gyroscope of claim 3, further including an APC circuit and wherein the drive circuit is controlled by the APC circuit.

5. The fiber-optic gyroscope of claim 3, wherein the transistor is a bipolar transistor.

6. The fiber-optic gyroscope of claim 3, wherein the transistor is a field-effect transistor.

7. The fiber-optic gyroscope of claim 1, wherein the sensing loop includes a high birefrigence polarization-maintaining fiber.

8. The fiber-optic gyroscope of claim 1, wherein the temperature detecting means includes a thermistor.

9. The fiber-optic gyroscope of claim 1, wherein the current detecting means includes:
   a resistance connected in series with the light source for generating a voltage between two ends thereof; and
   an A/D converter connected to the resistance for A/D converting the voltage generated between two ends of the resistance.

10. The fiber-optic gyroscope of claim 1, wherein the angular velocity information correcting means includes:
    a multiplexer connected to the temperature detecting means and the current detecting means for alternately outputting the first and second detection values;
    an A/D converter connected to the multiplexer for receiving and A/D converting the first and second detection values; and
    a CPU connected to the A/D converter for calculating a product of the first and second detection values and the angular velocity so as to output the product as a corrected angular velocity.

11. The fiber-optic gyroscope of claim 10, wherein the temperature detecting means includes a thermistor.

12. The fiber-optic gyroscope of claim 10, wherein the current detecting means includes:
    a resistance connected in series with the light source for generating a voltage between two ends thereof; and
    an A/D converter connected to the resistance for A/D converting the voltage generated between two ends of the resistance.

13. The fiber-optic gyroscope of claim 1, wherein the angular velocity information correcting means includes a table which stores correction values used to correct the angular velocity information, the corrected angular velocity being obtained by multiplying the first and second correction values and the angular velocity.

* * * * *